(12) United States Patent
Tahara et al.

(10) Patent No.: US 6,914,720 B2
(45) Date of Patent: Jul. 5, 2005

(54) TIME RESOLVED FLUORESCENCE MICROSCOPE

(75) Inventors: Tahei Tahara, Saitama (JP); Tatsuya Fujino, Saitama (JP)

(73) Assignee: Riken, Saitama (JP)

( * ) Notice: Subject to any disclaimer, the term of this patent is extended or adjusted under 35 U.S.C. 154(b) by 68 days.

(21) Appl. No.: 10/672,775

(22) Filed: Sep. 26, 2003

(65) Prior Publication Data

US 2004/0190134 A1 Sep. 30, 2004

(30) Foreign Application Priority Data

Mar. 27, 2003 (JP) ........................................ 2003-089026

(51) Int. Cl.$^7$ .............................................. G02B 21/00
(52) U.S. Cl. ..................... 359/368; 359/370; 356/318; 250/458.1
(58) Field of Search ............................... 359/368, 370, 359/371, 389; 250/458.1, 459.1, 461.1, 461.2; 356/317, 318

(56) References Cited

U.S. PATENT DOCUMENTS 5,005,927 A * 4/1991 Cudney et al. ................ 359/7
6,219,142 B1 * 4/2001 Kane .......................... 356/450

OTHER PUBLICATIONS

W. Becker, et al., Time resolved detection and identification of single analyte molecules in microcapillaries by time–correlated single–photon counting (TCSPC), Review of scientific instruments, vol. 70, No. 3, p. 1835–1841 (1999).

U. Neuberth, et al., Combining a scanning near–field optical microscope with a picosecond streak camera: Statistical analysis of exciton kinetics in GaAs single–quantum wells, Applied physics letters, vol. 80, No. 18, p. 3340–3342 (2002).

Satoshi Takeuchi, et al., Ultra Fluorescence Study on the Excited Singlet–State Dynamics of all–trans–Retinal, J. Phys. Chem. A., vol. 101, No. 17, p. 3052–3060 (1997).

Tatsuya Fujino, et al., Development of femtosecond time–resolved fluorescence microscope, General discussion on molecular structures, Abstracts of lectures, 3A15, p. 166 (2002) and the English translation of the relevant portion.

Tahei Tahara, Time–resolved spectroscopy and condensed––phase dynamics, General discussion on molecular structures, Abstracts of lectures, 4ES05, p. 8 (2002) and the English translation of the relevant portion.

Tahei Tahara, Observation of ultra–fast molecule dynamics by femto second fluorescence spectroscopy, and its expansion into microscopic space, Riken Symposium, Molecular Ensemble 2002, p. 48–49 (2002) and the English translation of the relevant portion.

Tahei Tahara, Condensed–phase molecular dynamics in pico–and femto–second regions, Symposium by micro–spectroscopy section of spectroscopical society of Japan, text, p. 3–4 (2002) and the English translation of the relevant portion.

Tatsuya Fujino, et al., Femtosecond fluorescence up–conversion microscopy: exciton dynamics in α–perylene microcrystal, J. Phys. Chem. B, vol. 107, No. 22, p. 5120–5122 (2003).

* cited by examiner

Primary Examiner—Mark A. Robinson
Assistant Examiner—Lee Fineman
(74) Attorney, Agent, or Firm—Norris McLaughlin & Marcus PA (57) ABSTRACT

A time-resolved fluorescence microscope having high spatial and time resolution. Fluorescence from a sample 26 mounted on a confocal inverted optical microscope 19 and excitation laser light are simultaneously incident on a non-linear optical element 32 to produce sum-frequency light 34. Time-resolved fluorescence from the sample is measured by varying the amount of delay in an optical delay line 33.

5 Claims, 12 Drawing Sheets

TIME RESOLVED FLUORESCENCE MICROSCOPE

BACKGROUND OF THE INVENTION

1. Technical Field

The present invention relates to a time-resolved fluorescence microscope capable of carrying out a femtosecond-order time-resolved measurement of fluorescence from a microregion.

2. Background Art

A time-resolved fluorescence microscope utilizing time-resolved fluorescence spectroscopy and an optical microscope in combination is a useful apparatus that can provide information relating to the electronic states of molecules in a microregion accurately without interference from other factors. Time-resolved techniques used in the conventional time-resolved fluorescence microscope can be roughly classified into two groups. One is the time-correlated single-photon counting method, and the other is the streak camera method.

Figure 2:
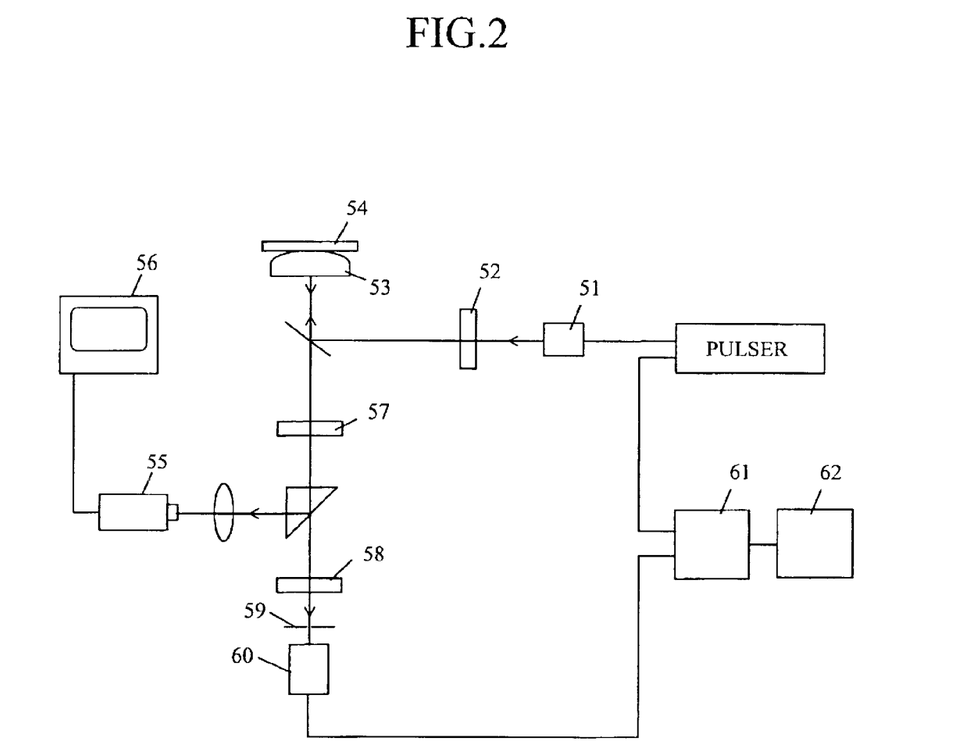
FIG. 2 schematically shows a time-resolved fluorescence microscope in which a time-correlated single-photon counting device is used.

FIG. 2 shows an example of a time-correlated single-photon counting apparatus (see Non-patent document 1). Pulsed light emitted by a laser diode 51 passes through a filter 52 and is then condensed by a microscope objective lens (oil-immersion objective) 53 to produce an excitation light, with which a microregion on a sample 54 is photoexcited. The excitation-light irradiated position on the sample can be adjusted by finely moving the sample while monitoring an enlarged sample image using a monitor 56 captured by a CCD camera 55. Fluorescence emitted by the sample due to irradiation with the excitation light is subjected to wavelength selection in filters 57 and 58, and then detected by a photodiode 60 via a pin hole 59. The resultant electronic signal pulse from the photodiode 60 is fed to a time-to-amplitude converter (TAC) 61. On the other hand, an electric pulse from laser diode is fed to TAC 61 as a trigger. TAC 61 outputs an electric pulse corresponding to the time difference between the trigger pulse and a signal pulse from a photodiode 60. The electric pulse is then fed to a multi-channel analyzer (MCA) 62 to obtain the distribution of time difference and number of signals from a photodiode. As a result, a waveform can be obtained that corresponds to the time decay of the fluorescence from the sample disposed under the microscope.

The streak camera method involves the introduction of fluorescence from a sample under a microscope into a streak tube after passing through a spectroscope, using an electric signal from laser as a trigger. The incident light hits the photo-cathode, whereby the light is converted into electrons. The electrons thus produced are accelerated, and their flying direction is changed by a voltage applied between the top and bottom of the streak tube. By varying the applied voltage at high speed, the time distribution of fluorescence can be captured in terms of spatial changes (see Non-patent document 2).

As a method of time-resolved measurement of fluorescence emitted by a bulk sample, a sum-frequency generation method (up-conversion method) is known, whereby a pulsed light emitted by laser is divided in two. One portion of the pulsed light is used as a sample excitation light, and fluorescence emitted by the sample is mixed with the other portion of the pulsed light (gate pulse) in a non-linear optical crystal. Then, the light of the sum frequency of the mixed light emitted by the non-linear optical crystal is detected (see Non-patent document 3). In this method, time-resolved measurement of fluorescence can be carried out by repeating the measurement while varying the delay time of the gate pulse.

Non-patent document 1: Review of Scientific Instruments, vol. 70, pp.1835–1841, 1999

Non-patent document 2: Applied Physics Letters, vol. 80, No. 18, pp.3340–3342, 2002

Non-patent document 3: Journal of Physical Chemistry A, vol. 101, pp.3052–3060, 1997

Generally, in order to analyze the various dynamic behaviors (chemical reactions, energy transfer, etc.) of objects, time resolution of the order of sub-picoseconds ($10^{-12}$ seconds or less) to several hundred femtoseconds ($10^{-13}$ seconds) is required. However, the conventional time-resolved fluorescence microscopes can only provide insufficient time resolution of the order of nanosecond ($10^{-9}$ seconds) to several tens of picoseconds ($10^{-11}$ seconds). This is due to the fact that they employ methods based on a single-photon counting apparatus or a streak camera for time-resolved measurement, by which fluorescence is electrically processed. In fact, time resolution of the order of 40 ps is the limit in apparatuses employing the time-correlated single-photon counting method. Further, the time resolution of time-resolved fluorescence microscopes using a streak tube is of the order of 5 ps at most. The streak camera method can be used for time-resolved measurement without the use of a spectroscope, whereby high time resolution of the order of 300 femtoseconds can be obtained. In this case, however, the wavelength of fluorescence cannot be determined. While the up-conversion method is capable of measuring fluorescence with high time resolution, it is not adapted for the measurement of microregions and cannot be expected to provide microscopic spatial resolution as is.

A confocal microscope, which is a kind of optical microscope, is capable of selectively measuring depthwise information about an object by reducing the pin hole size provided in the microscope. However, in actual measurements, the size of the pin hole must be sufficiently large such that a sufficiently strong signal can be obtained. Thus, the confocal microscope has a limited spatial resolution in the depth direction. Thus, it is very much desired to improve the depth resolution of the confocal microscope.

SUMMARY OF THE INVENTION

It is therefore an object of the present invention to provide a time-resolved fluorescence microscope having high spatial and high time resolution that is capable of performing time-resolved measurement of fluorescence from a nanometer order microregion with femtosecond time resolution, using an optical microscope.

In the present invention, a sum-frequency generation method (up-conversion method) is adopted in order to improve both the time resolution and a depth-direction spatial resolution simultaneously. The time resolution is improved by a factor of about 100 ($\leq 600$ femtoseconds) over the conventional method. The depth-direction spatial resolution is approximately doubled over the conventional confocal microscope.

Conventionally, measurement of time resolution is conducted by electrical means such as a single-photon counting device (TAC; time to amplitude converter) or a streak camera. As a result, the time resolution is limited by the performance of the electrical means, and sufficient time resolution cannot be obtained for the purpose of monitoring fluorescence change in femtosecond regions. In the present invention, femtosecond-order time resolution ($\leq 600$ fs) can be obtained by adopting an optically time-resolving technique utilizing a non-linear optical effect referred to as up-conversion.

In one aspect, the invention provides a time-resolved fluorescence microscope comprising:

a pin hole;

a sample stage on which a sample is mounted;

an objective lens system for projecting a reduced-size image of the pin hole on the sample on the sample stage while focusing fluorescence emitted by the sample at the pin hole;

pulsed-laser emitting means;

light-dividing means for dividing laser light emitted by the pulsed-laser emitting means into two portions;

means for causing one portion of the laser light divided by the light-dividing means to enter the pin hole as a sample excitation light;

optical-path length varying means for varying the optical path of the other portion of the laser light divided by the light-dividing means;

a non-linear optical element for mixing the fluorescence from the sample exiting from the pin hole and the laser light that has passed through the optical-path length varying means to produce a sum frequency light;

spectroscope means for analyzing the sum-frequency light produced by the non-linear optical element to spectroscopy;

a detector for detecting light emerging from the spectroscope means; and recording means for recording an output obtained from the detector as the optical path length of the other portion of the laser light is varied by the optical-path length varying means.

Preferably, a prism pair is disposed in the optical path of the sample excitation light between the light-dividing means and the pin hole, and a negative dispersion is given to the excitation light in advance. By providing the excitation light with a negative dispersion in advance, the sample can be excited with a shortest-time width pulse at the sample position. By using the prism pair, negative group velocity, dispersion can be artificially created. Normally, when pulsed light of the femtosecond order passes through a medium such as a lens or mirror, the speed with which each wavelength of the light passes through the medium varies due to different indexes of refraction in the medium of the individual wavelengths of the light making up the pulse (a femtosecond-order pulse has a spectrum width of the order of 10 nm). As a result, the time width of the laser pulse elongates (longer-wavelength components proceed faster than shorter-wavelength components). As the pulse passes through the prism pair, the longer-wavelength components are delayed while advancing the shorter-wavelength components, whereby the pulse time width can be compressed as a result. The prism pair in the invention is provided with a negative dispersion such that a positive dispersion (time-wise spreading of pulse) that is created when the light passes through the objective lens or the like in the microscope can be cancelled in advance. Accordingly, the sample portion can be excited with light having minimum dispersion.

Preferably, a ½ wavelength plate may be disposed in the optical path of the sample excitation light, and a control unit may be further provided for controlling the angle of the ½ wavelength plate and the optical-path length varying means in an interlocked manner. In this configuration, fluorescence can be measured while the polarization direction of the excitation light is automatically controlled, so that polarization anisotropy can be automatically measured.

Preferably, a collimator lens, an iris and a condenser lens are disposed between the non-linear optical element and the spectroscope means, the collimator rendering the light that has passed through the non-linear optical element into parallel light. The sum-frequency light produced by the non-linear optical element is separated before being incident on the spectroscope means. The optical element disposed between the pin hole and the objective lens system for bending the optical path is preferably a total reflection mirror.

DESCRIPTION OF THE INVENTION

Embodiments of the invention will be hereafter described by referring to the drawings.

Figure 1:
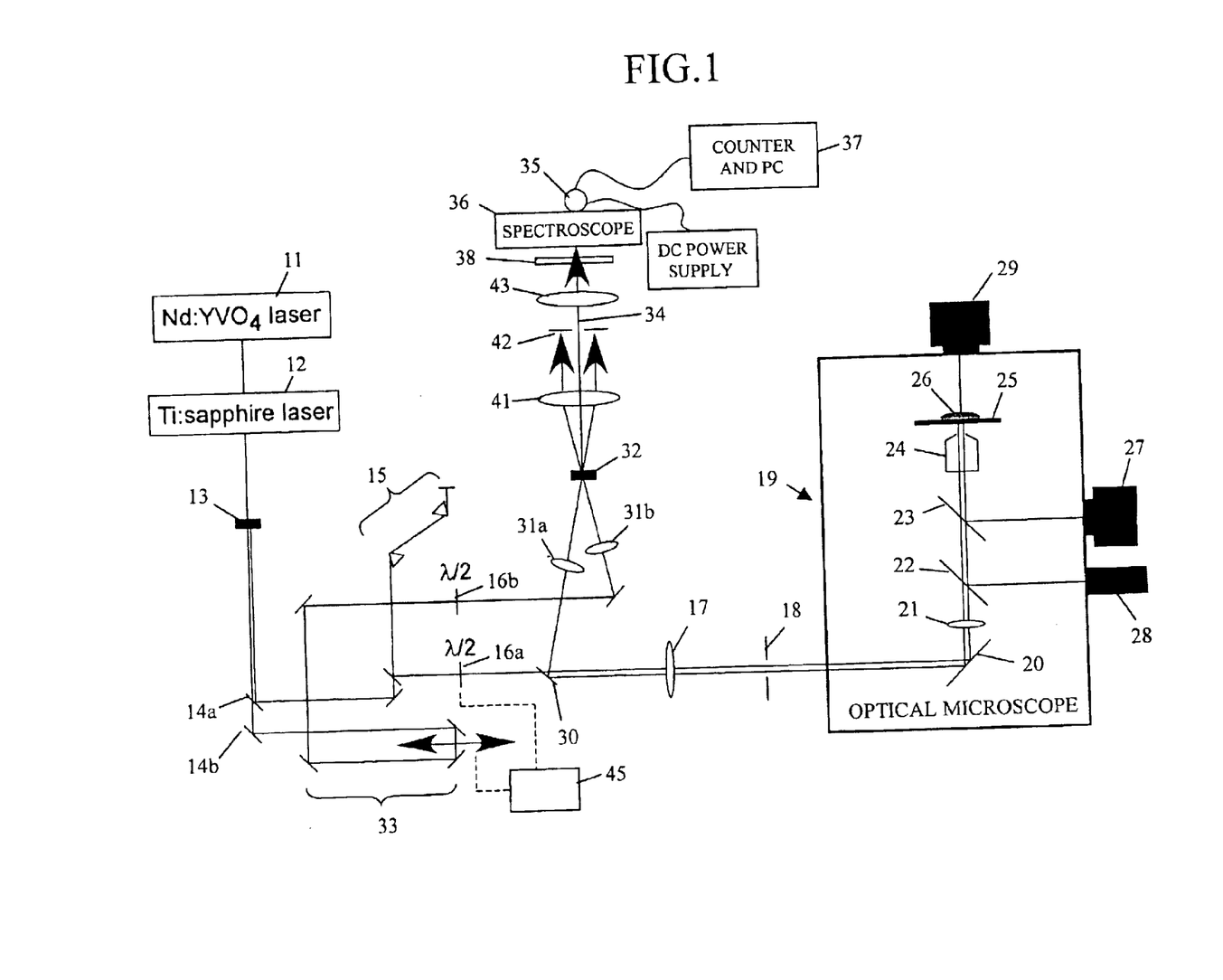
FIG. 1 schematically shows a femtosecond time-resolved fluorescence microscope according to the invention.

FIG. 1 schematically shows a femtosecond time-resolved fluorescence microscope according to the invention.

A fundamental wave (central wavelength 800 nm, optical output 750 mW, pulse repetition frequency 82 MHz, pulse time width 75 fs) of a Ti:sapphire laser 12 excited by a Nd:YVO$_4$ laser 11 is condensed onto a non-linear optical element 13. The resultant secondary harmonic (400 nm, 50 mW) is used as a light source for sample excitation. Excitation light (400 nm) that is generated is reflected by a wavelength selection mirror 14a. After a negative group velocity distribution is given in advance by a distribution-compensating prism pair 15, the excitation light passes through a ½ wavelength plate 16a, a condenser lens 17 and a confocal pin hole 18, before being introduced into an inverted microscope 19. The excitation light is further condensed onto a sample 26 on a stage 25 by objective lenses 21 and 24. Fluorescence from the sample 26 is collected by the same objective lenses 24 and 21 and taken outside the microscope 19. The fluorescence from the sample 26 is separated from the excitation light by a wavelength selecting mirror 30 and is then condensed by a fluorescence condenser lens 31a onto a non-linear optical element (1 mm thick, $\beta$-$BaB_2O_4$ (BBO)) 32.

The fundamental wave of the Ti:sapphire laser 12 is reflected by a wavelength selection mirror 14b, passed through an optical delay circuit (delay line) 33 and a ½ wavelength plate 16b, before being condensed by a fundamental wave condenser lens 31b onto the non-linear optical element 32 (gate light). The fluorescence from the sample 26 and the fundamental wave of laser are condensed such that they are superposed at the same position of the non-linear optical element 32, thereby producing a sum frequency light 34 (up-conversion method). The up-conversion method is a method whereby fluorescence from a sample is condensed into a non-linear optical crystal together with a femtosecond laser pulse of a different frequency, in order to produce their sum frequency light (light with a sum energy). The sum frequency light can be produced only when the fluorescence from the sample and the femtosecond laser pulse are present in the crystal at exactly the same time. Thus by observing the sum frequency light 34 while moving the optical delay circuit 33 disposed towards the femtosecond laser pulse back and forth, the time dependence of the fluorescence from the sample can be monitored in terms of the time behavior of sum frequency light. The wavelength of the fluorescence from the sample that is used for the generation of sum frequency light can be adjusted by varying the angle of the BBO crystal 32.

The sum frequency light 34 passes through a stray-light cutting iris 42 and is then fed to a spectroscope 36 to which a photon-counting photomultiplier 35 having built inside a discriminator. The number of signals (photons) detected by the photomultiplier 35 is measured by a counter 37 connected to a personal computer. Intensity changes in the sum frequency light 34 are monitored while moving the delay line 33 for optical delay back and forth, in order to carry out time-resolved measurement of the fluorescence from the sample 26.

The photon counting method used in measuring fluorescence is a highly sensitive method of counting photons in fluorescence one by one. However, the method, due to its high sensitivity, picks up a dark count due to stray light as a large value. In the present apparatus, the sum frequency light produced by the non-linear optical element 32 is spatially separated using an iris 42 (spatial filter) in order to minimize such a dark count, so that S/N can be improved. The sum-frequency light is brought back to parallel light by a collimation lens 41. The parallel light is passed through the iris 42 and is then incident on the spectroscope 36 via the condenser lens 43. When the iris 42 is not provided, the dark count is about 6 to 7 counts per second, while in accordance with the present method the dark count can be reduced to about 2 to 3 counts per second while maintaining the same signal optical intensity. An optical band-pass filter 38 was also put before the entrance slit of the spectroscope 36 to make only up-converted signal enter the spectroscope 36.

The ½ wavelength plate 16a for changing the polarization of the excitation light is mounted on an automatic rotation holder, such that the optical delay circuit 33 and the automatic rotation holder with the ½ wavelength plate mounted thereon can be controlled by a control unit 45 in a synchronized manner. Specifically, they are controlled by the control unit 45 in such a manner that when a certain delay amount is set in the optical delay circuit 33, a measurement can be carried out where the polarization direction of the excitation light is rotated by 90° by the ½ wavelength plate 16a at that delay amount.

Referring now to the optical microscope 19, two half-mirrors 22 and 23 are disposed between the objective lens 24 and the second objective lens 21, where the light proceeds in parallel. One of the half mirrors is assigned for a white light source 27 for reflection illumination and the other is assigned for a CCD camera 28 for monitoring. In this way, the laser light can be observed as it irradiates the sample 26 while at the same time observing the sample as a whole using the white light from the illuminating light source 27. The laser light is introduced into the optical microscope through a focusing system, and a pin hole 18 is placed in front of the microscope, thus forming a confocal optical system.

In order to reduce the dispersion of the femtosecond ultra-short pulsed light due to the optical elements in the microscope, the optical element by which the light is reflected upwards for the first time is comprised of an aluminum mirror 20 that reflects a visible region with high reflectance. Specifically, a total reflection (aluminum) mirror with a maximum reflection at around 550 nm is mounted instead of an optical element (prism) mounted inside the optical microscope 19. In this way, the loss of intensity of the fluorescence from the sample as well as the excitation light inside the microscope can be prevented. At the same time, the replacement with the total reflection mirror enables to prevent the dispersion of light due to the passing of the femtosecond pulsed light through a medium, so that the fluorescence from the sample can be measured with high time resolution. The white light source 29 for transmission illumination that is mounted opposite the objective lens 24 is mainly used for the adjustment of optical axis laser light. During optical axis adjustment, white light is guided to the outside of the microscope and made coaxial with laser light.

Further, in accordance with the invention, the confocal optical arrangement is used in combination with the up-conversion method so that the spatial resolution of the sample in a vertical (optical axis) direction can be improved. The resolution in a vertical direction in the confocal optical arrangement is related to the size of the pin hole placed in front of the microscope. The resolution is usually on the order of 10 micrometers when a pin hole with a size of 500 micrometers is used. In the present invention, however, the vertical spatial resolution is improved due to the fact that the fluorescence from the sample simultaneously goes through an up-conversion process. For example, when a pin hole with a similar size of 500 micrometers is used, the vertical spatial resolution can be approximately doubled to 4.6 micrometers. By using a pin hole with an even smaller size in the confocal arrangement, an even higher vertical spatial resolution can be obtained.

Further, in the present invention, a pulsed laser with a high repetition rate ($\leqq 80$ MHz) is used for the optical excitation of the sample. This makes it possible to stop the Brownian motion of microscopic objects with sizes of the order of micrometers that exist in a solution phase using a laser trap method, which takes advantage of the light pressure of the laser light and the difference in refractive index between the solvent and the sample, and to carry out time-resolved fluorescence measurement of the sample while manipulating it under laser light. While in the conventional laser trap method, a CW laser (such as Ar+) is separately required for trapping, the apparatus can be simplified in accordance with the invention because the sample excitation laser can be also used as trapping light.

Hereafter examples of measurement using the time-resolved fluorescence microscope of the invention will be described.

MEASUREMENT EXAMPLE 1

Figure 3:
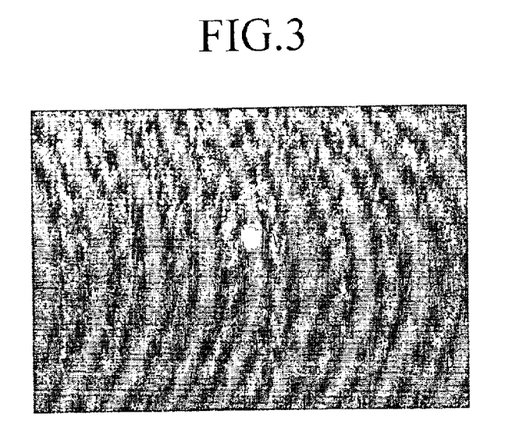
FIG. 3 shows a fluorescent bead (particle size 4.9 mm) while laser-trapped.

FIG. 3 shows a CCD camera image of a polystyrene latex bead with a particle size of 4.9 µm laser-trapped by an excitation light (with excitation power of 1 mW or less and a ×100 objective lens). This polystyrene latex bead is a polymer particle (manufactured by Ceradyne, Inc.) containing a pigment molecule coumarin 519. The beads were distributed in water and one particle was selected under microscope. It will be seen that the Brownian motion of the bead was stopped by the laser light with high repetition while fluorescent molecules in the bead emitted fluorescence by electronic excitation.

Figure 4:
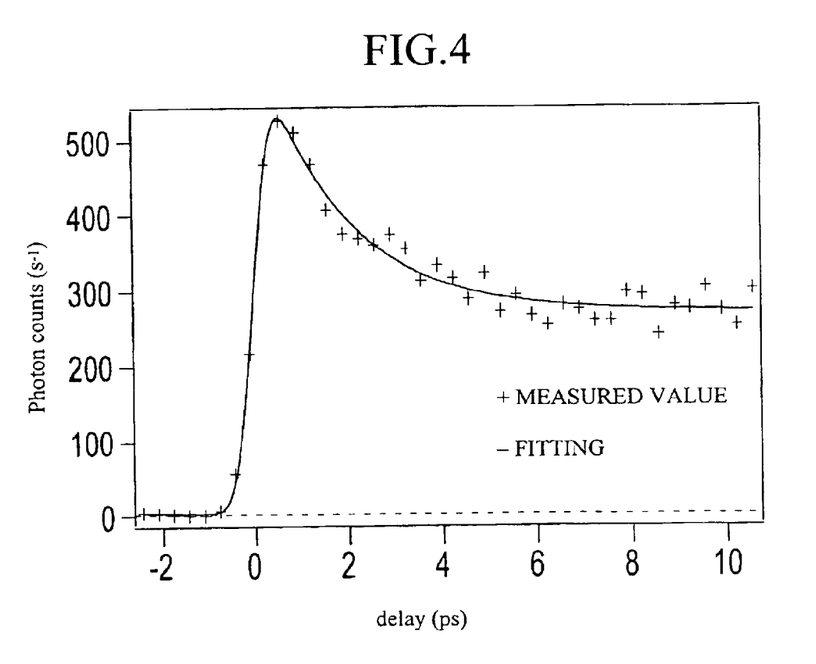
FIG. 4 shows a time dependence of fluorescence (520 nm) from the fluorescent bead.
Figure 5A:
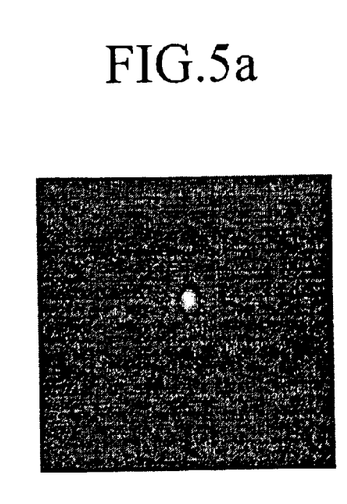
FIGS. 5a–d illustrate the laser-trapping technique using only a spectroscopy laser (excitation light) according to the invention.
Figure 5B:
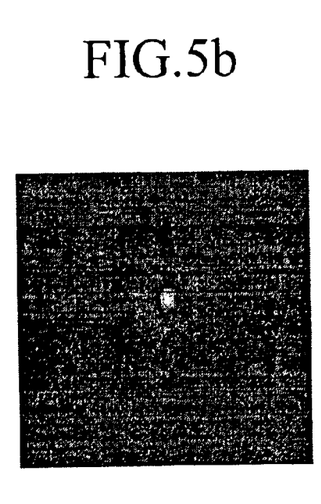
Figure 5C:
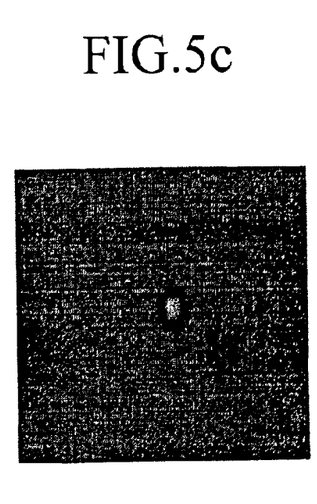
Figure 5D:
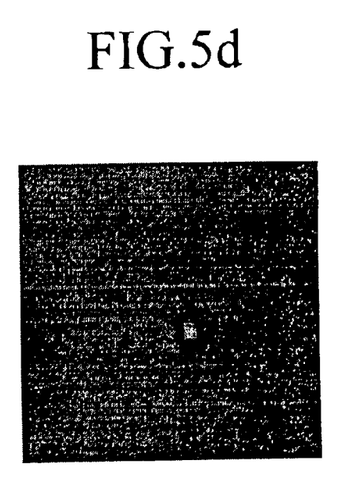

The fluorescent beads used show steady-state fluorescence spectrum with a maximum at 520 nm. FIG. 4 shows the result of time-resolved measurement of fluorescence at this wavelength using the apparatus of the invention with femtosecond time resolution. The resultant time dependence showed decay consisting of two components. It is believed that a longer lifetime component is the fluorescence from the fluorescent molecules in the beads and a shorter lifetime component is the fluorescence from the beads themselves.

When a microscopic object is dissolved in a solution, it freely moves about due to Brownian motion and it is therefore very difficult to conduct a spectroscopic measurement of such a single small object. In this case, conventionally the motion of the object can be stopped by means of a laser trap method (laser manipulation method). This is a very effective technique taking advantage of the light pressure of the laser light. However, the conventional method requires that another laser (CW, continuous light) be provided for laser trapping purpose (as separate from the laser for spectroscopy). In the method of the invention, however, a Ti:sapphire pulsed laser with a high repetition rate (82 MHz) is used as the spectroscopy laser, so that the spectroscopy laser light (excitation light) can be used as if it were a continuous light with respect to the object to be trapped. Thus, the trapping light source can be dispensed with and the apparatus can be simplified.

FIG. 5 illustrates how the laser trapping is conducted in accordance with the invention using only the spectroscope laser (excitation light). FIGS. 5(a) and (b) shows a fluorescent bead while laser-trapped by the spectroscope laser (excitation light) using the time-resolved fluorescence microscope of the invention. The Brownian motion of the bead is stopped by the excitation light, so that the fluorescent bead can be subjected to spectroscopy. When the excitation light is cut off, the fluorescent bead starts to move due to Brownian motion, as shown in FIGS. 5(c) and (d).

Figure 6A:
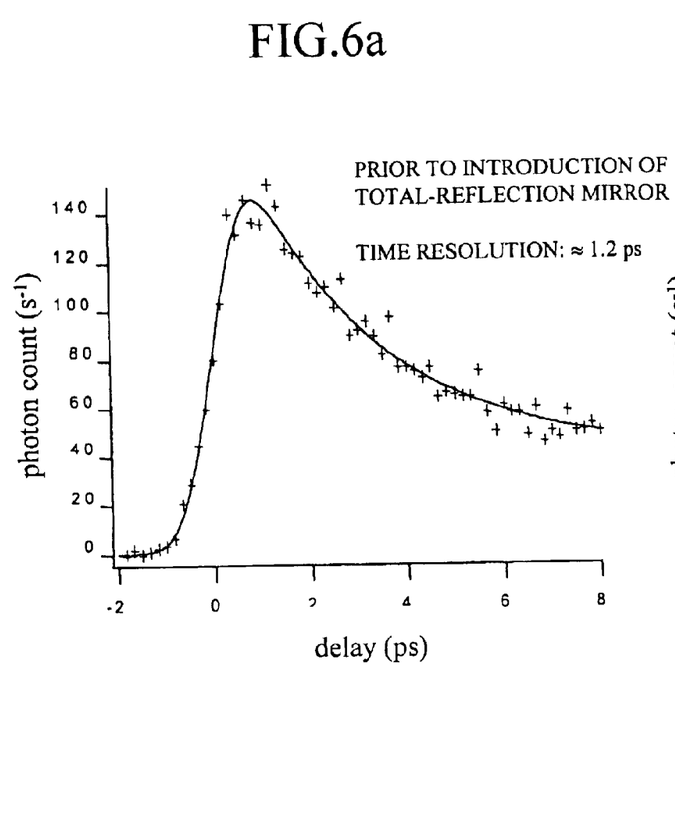
FIGS. 6a–b show the effect of using a total reflection mirror, instead of a prism, as an optical element by which the light is reflected upward for the first time in an optical microscope.
Figure 6B:
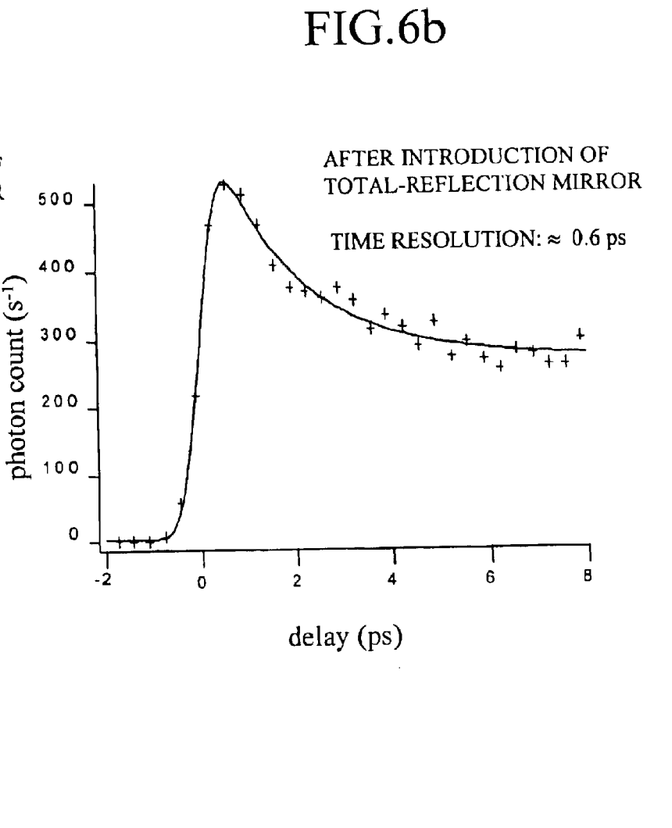

FIG. 6 shows the effects of using a total reflection mirror with a maximum of reflection at around 550 nm as the optical element 20 by which the light is reflected for the first time in the optical microscope, instead of the prism. FIG. 6(a) shows the time dependence of the fluorescence from the fluorescent beads while laser-trapped that was measured by the time-resolved fluorescence microscope of the invention, in the case where a prism was used as the optical element 20. The excitation light was 400 nm and the fluorescence measurement wavelength was 520 nm. The time resolution was about 1.2 ps. FIG. 6(b) shows the time dependence of fluorescence from the fluorescent beads measured under the same conditions except that the optical element was comprised of a total reflection mirror with a maximum of reflection at around 550 nm. It will be seen that the rise of the time-resolved fluorescence became steeper in (b), which shows that the time resolution has been improved (time resolution was about 600 fs). It will also be seen that when the fluorescence intensities on the vertical axis are compared in the region near the time origin, the signal intensity became stronger in (b) by a factor of about 3.5, thus indicating the reduction of fluorescence loss due to the microscope (prism).

MEASUREMENT EXAMPLE 2

Figure 7A:
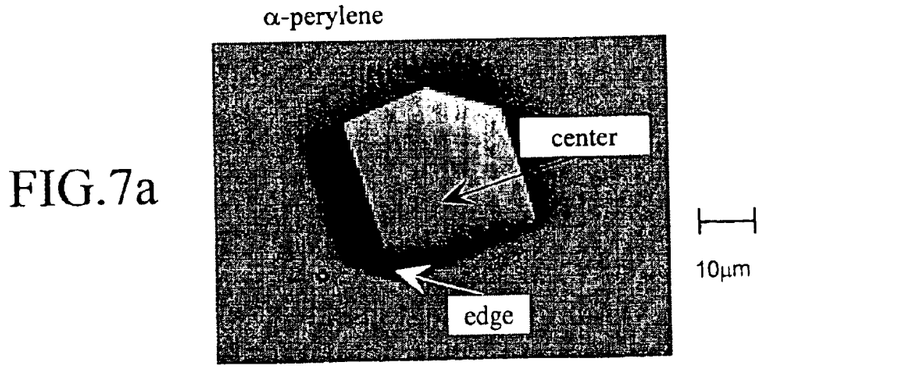
FIGS. 7a–b show CCD camera images of an α-perylene microcrystal.

FIG. 7(a) shows a CCD camera image of α-perylene microcrystal prepared according to the description in Chem. Phys. Lett., 1993, 211, 364. There are two kinds of perylene crystal, namely α-perylene and β-perylene. In α-perylene, four molecules form a unit cell and create a dimer crystal structure. In β-perylene, two molecules form a unit cell. These two kinds of crystal exhibit different fluorescence spectra, and therefore an α-perylene microcrystal was selected by checking the steady-state fluorescence spectra under microscope. At room temperature, α-perylene emits fluorescence in a very wide visible region, with a maximum intensity located at around 600 nm. The fluorescence with such a wide region is thought to be caused by the emission from exciton that is produced by optical excitation. It is known that fluorescence in high-energy region is a light emission caused by free exciton directly generated by optical excitation. Free exciton is relaxed to a Y-state (partly relaxed excimer), and the fluorescence at around 530 nm corresponds to the Y-state. Then, the Y-state is relaxed to an E-state (completely relaxed excimer, self-trapped exciton) where a wide and strong fluorescence is emitted at around 600 nm. The light emission from the E-state dominates the steady-state fluorescence that is observed at room temperature. In order to clarify the energy relaxation process in a microcrystal at room temperature, the inventors conducted time-resolved fluorescence measurement using the time-resolved fluorescence microscope according to the invention.

Figure 7B:
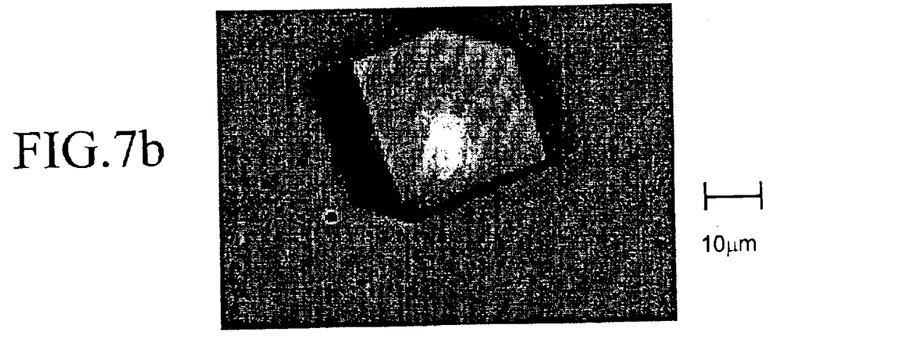

FIG. 7(a) shows a time-resolved fluorescence (520 nm) observed at a central portion of the α-perylene microcrystal. FIG. 7(b) shows a CCD camera image during optical excitation. The observed time dependence can be well reproduced by the sum of three exponential functions with consideration given to the response time of the apparatus. While the two time constants were determined with high precision such that $\tau_1=2.2$ ps and $\tau_2=38.7$ ps, it was difficult to determine with high precision the third time constant due to its long lifetime ($1\ ns \leq$). The observed decay of fluorescence was not influenced by variations in excitation pulse energy, as the relative intensity of the three components was not. This indicates that the concentration of the exciton that was generated under these experiment conditions was relatively small and that the influence of exciton-exciton annihilation on time constants can be ignored.

The attribution of the observed three kinds of decay components were conducted based on the wavelength-dependency of time-resolved fluorescence signals. A fluorescence decay at 480 nm, where the emission from free exciton is dominant (FIG. 8(b)), contributes very greatly to the first lifetime ($\tau_1$) component, as compared to the fluorescence variation at 520 nm. The second lifetime ($\tau_2$) component is very small, and the third, very slow component was nowhere to be seen. On the other hand, a great contribution from the long-lifetime component was observed in fluorescence decay at 600 nm (FIG. 8(c)). The results directly indicate that the $\tau_1$ and $\tau_2$ components are attributed to the fluorescence from the free exciton and the Y state, respectively, where as the third slow component is assigned to the E-state.

MEASUREMENT EXAMPLE 3

The position-dependency of exciton emission in an α-perylene microcrystal was investigated using the high spatial resolution of the femtosecond time-resolved microscope according to the invention.

Figure 7C:
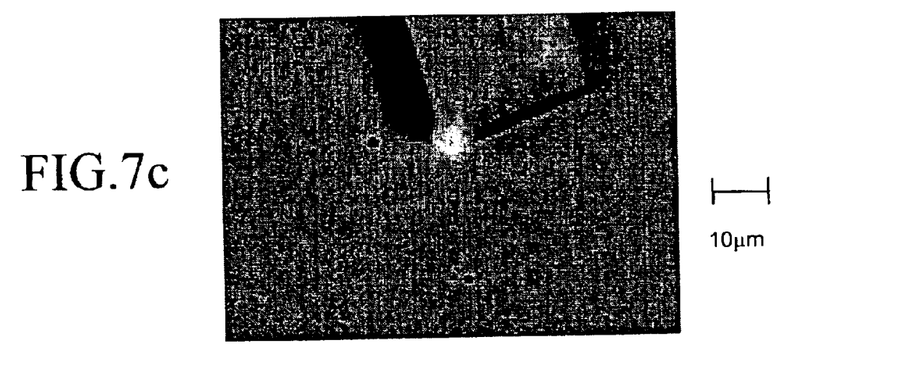
Figure 9:
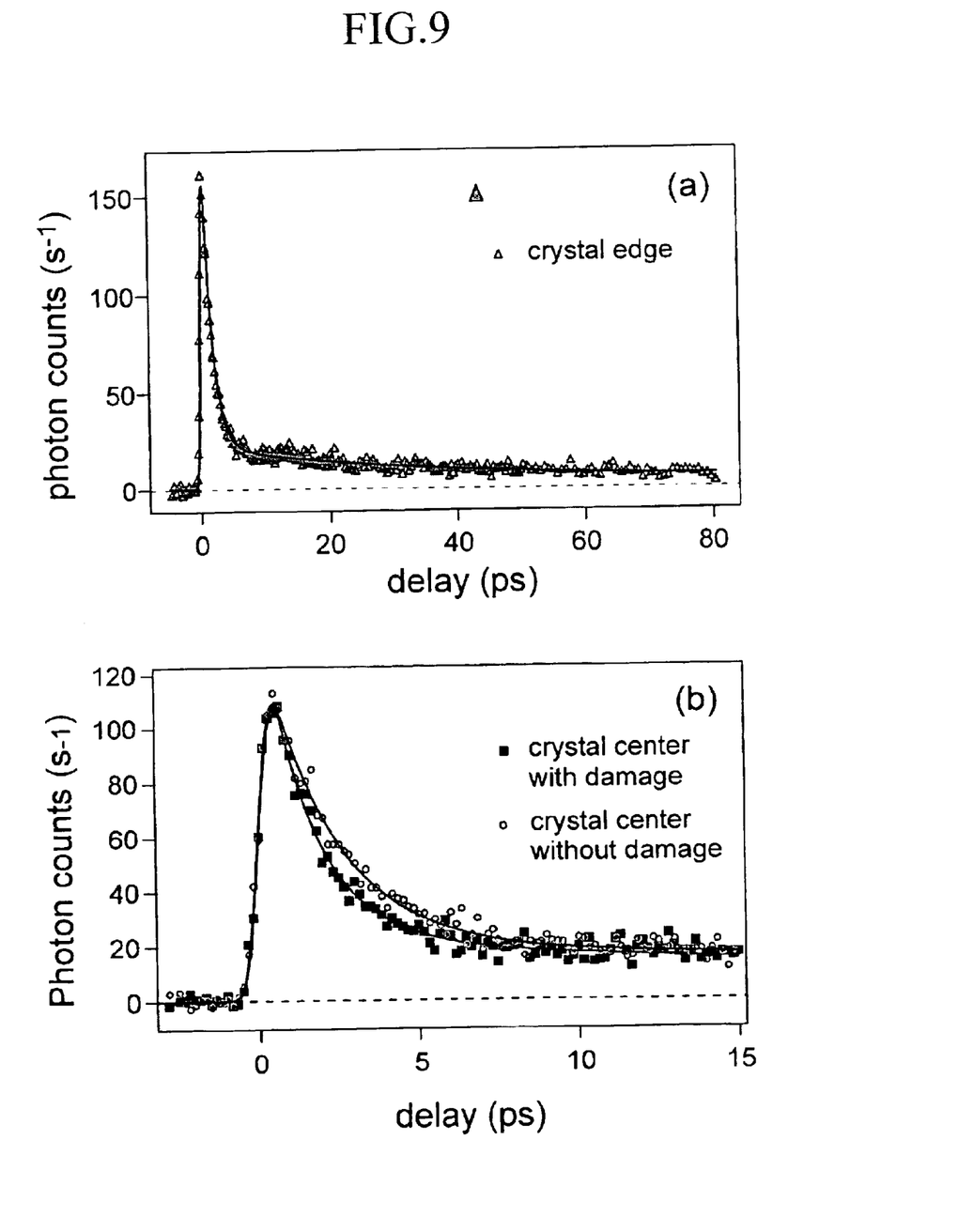
FIG. 9 shows femtosecond time-resolved fluorescence obtained at the edge of the microcrystal.

FIG. 9(a) shows a time-resolved fluorescence (520 nm) measured by optically exciting an edge portion of a microcrystal. FIG. 7(c) shows a CCD camera image of the microcrystal under optical excitation, in which a bright spot indicates the location of irradiation by the excitation laser light. The observed decay curve was well reproduced by the sum of three exponential functions, as in the case of excitation of the center of the microcrystal. However, the lifetime of free exciton and Y-state was very short, namely $\tau_1=1.4$ ps and $\tau_2=29.8$ ps. Although no difference in steady-state fluorescence spectra could be observed between the excitation of the central portion of the microcrystal and that of the edge portion thereof, it is clear that local environments greatly affects the relaxation of exciton. The edge portion of the crystal has deteriorated regularity as compared to the central portion thereof and is expected to have a high defect density. Accordingly, it is likely that the observed variation in exciton relaxation is due to a difference in defect densities in the microcrystal.

In order to confirm this, the central portion of the microcrystal was irradiated with a large-output laser light to damage it, and then the time-resolved fluorescence signals before and after giving, the damage were compared. As a result, the lifetime of free exciton and Y-state became clearly shorter after the damage had been given, as shown in FIG. 9(b). As the defect density of the damaged portion is high, this result indicates that the presence of the defect had an influence on the lifetime of exciton light-emission, whereby the energy relaxation is accelerated.

Figure 8:
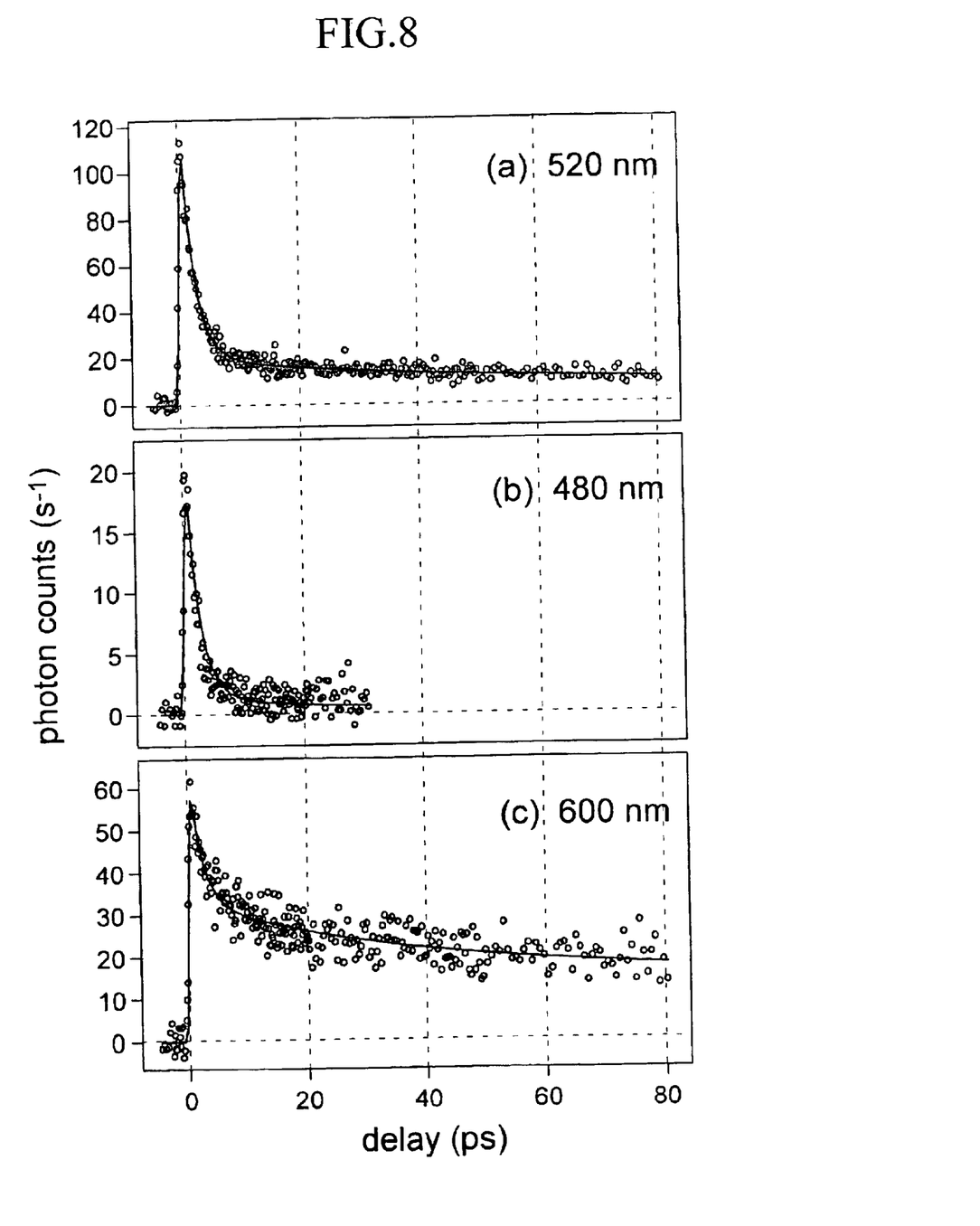
FIG. 8 shows femtosecond time-resolved fluorescence obtained at the center of the microcrystal.
Figure 10:
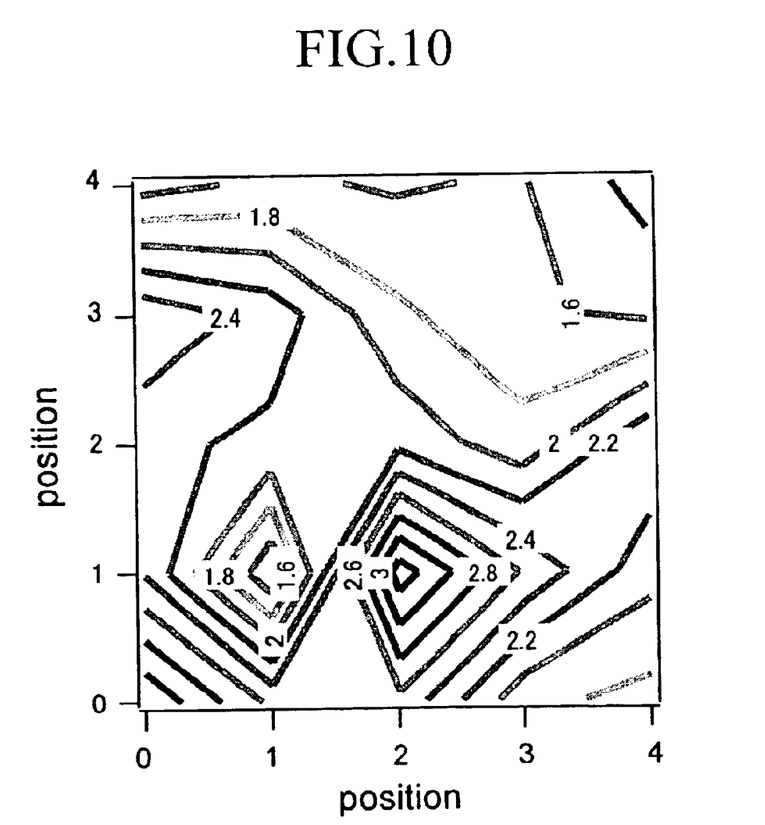
FIG. 10 shows a two-dimensional contour plotting of variations in the lifetime of free excitons due to differences in position in an α-perylene microcrystal measuring about 20×20 μm.

FIG. 10 shows a two-dimensional contour plotting of variations in the lifetime of free excitons due to differences in position in an α-perylene microcrystal measuring about 20×20 μm that was prepared according to the description in the aforementioned publication Chem. Phys. Lett., 1993, 211, 364. The unit of the numbers in the figure are picosecond. At the center of the crystal, emission of light from free excitons with lifetime of the order of 2.2 to 2.4 ps was mainly observed, as shown in FIG. 8. At the edge of the crystal, or at some parts of the crystal, significantly different lifetimes can be observed. Thus, by conducting a "dynamics imaging" utilizing the femtosecond-order time resolution, a novel type of image (information) of substances can be obtained, which cannot be obtained by the ordinary microscopes or by the conventional time-resolved fluorescence microscopes with limited time resolution.

The femtosecond time-resolved fluorescence microscope according to the invention has the time resolution of femtosecond order and the spatial resolution of the order of nanometers. By using the time-resolved fluorescence microscope of the invention, ultra-short exciton fluorescence can be observed while spatially resolving the position in the microcrystal. The femtosecond time-resolved fluorescence microscope of the invention can be applied to the study of ultra-short phenomena in materials containing microstructures, such as devices or living cells in addition to the organic microcrystals shown in the above-described measurement examples. Thus, the time-resolved fluorescence microscope of the invention can provide a robust tool for the investigation of molecular characteristics in micrometer-order structures and should therefore play an important role in nanoscience and nanotechnology.

MEASUREMENT EXAMPLE 4

In the femtosecond time-resolved microscope according to the invention, the optical delay circuit 33 and the automatic rotation holder with the ½ wavelength plate 16a mounted thereon can be controlled in a synchronized manner by the control unit 45. Thus, the polarization-dependency of the time resolved of fluorescence can be easily and accurately measured.

In solution generally, a motion of solute molecules occurs in picosecond time region. The rotational motion of solute is significantly affected by local environment and it is related to the transfer of substance. Thus, it is very important in chemical process in solution. In order to understand the rotational motion of molecules, it is necessary to observe the up-converted signal with changing the polarization of excitation light. These requirement can be satisfied by the apparatus of the invention.

Figure 11:
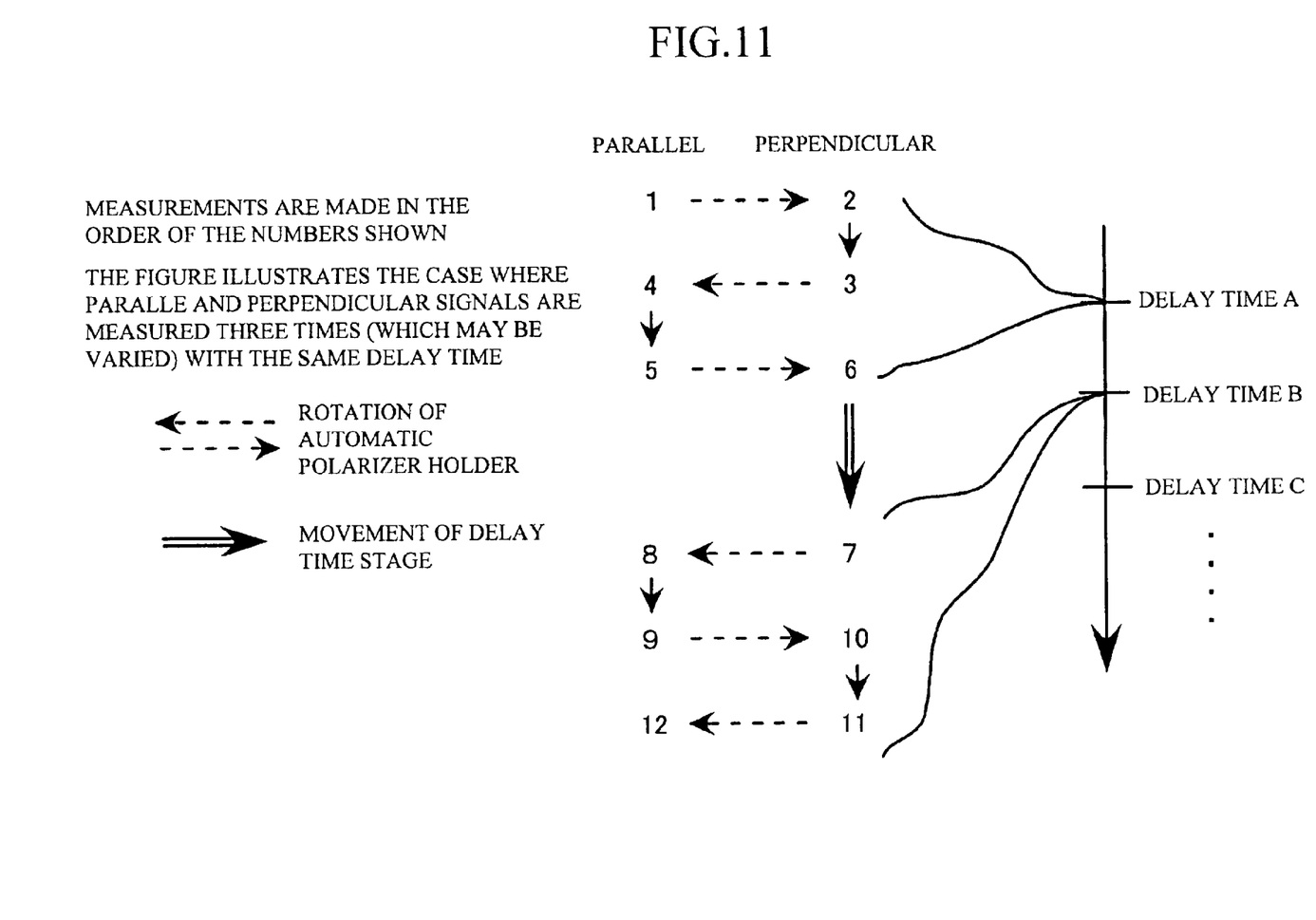
FIG. 11 shows the manner in which a polarizing plate and an optical delay line are controlled.

The rotation of the polarizing plate was controlled in the following manner. The time-resolved fluorescence measurement with polarized light was conducted with a certain delay time (with the stage fixed) the case where the polarization direction of the excitation light was parallel to that of the gate light and in the case where the polarization direction of the excitation light was perpendicular to that of the gate light. The measurement of the polarized light was conducted in the order of parallel→perpendicular, perpendicular→parallel, parallel→perpendicular, and so on, as shown in FIG. 11, rather than parallel→perpendicular→parallel→perpendicular, and so on. In this manner, the number of rotation of the polarizer holder can be reduced (it takes about a minimum of five seconds for rotation), thus reducing the measurement time. During measurement, a one-second accumulation is carried out normally five times (the number may vary) for each point (such as perpendicular 2). In the example of FIG. 11, each data of parallel and perpendicular configuration is measured three times, so that the parallel and perpendicular components at delay time A have been accumulated 3×5 seconds.

Figure 12A:
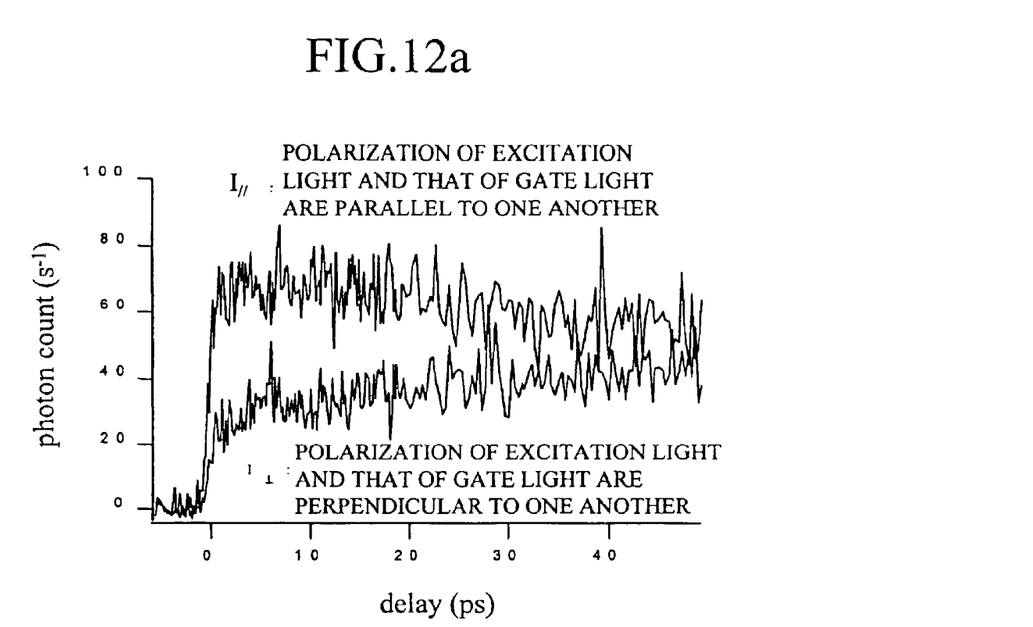
FIGS. 12a–b show measurement results obtained by the femtosecond time-resolved microscope according to the invention.
Figure 12B:
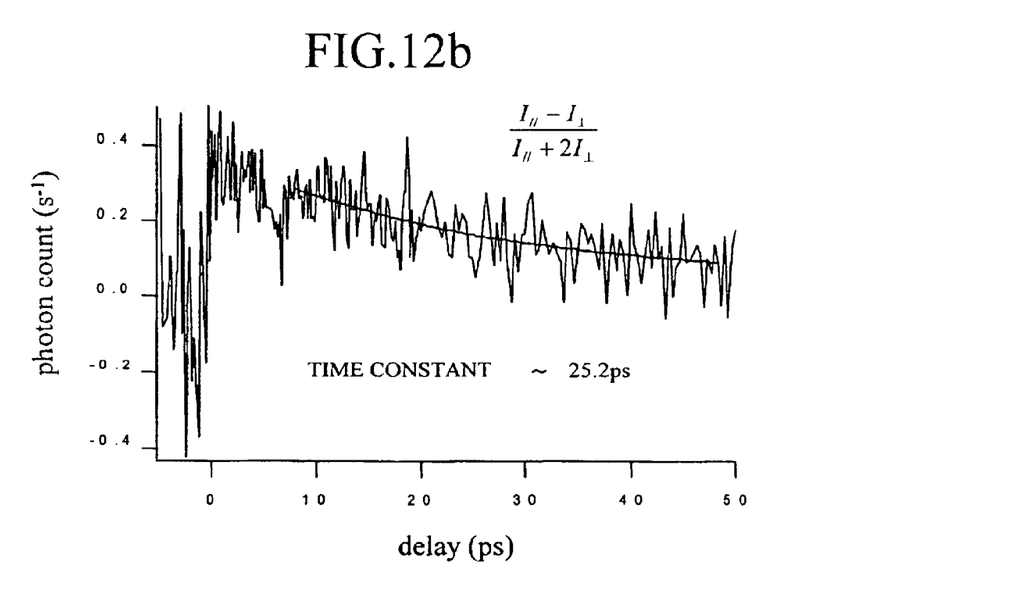

FIG. 12 shows the results of measurement using the femtosecond time-resolved fluorescence microscope of the invention. The figure shows the time dependence of fluorescence obtained from a microdroplet (a toluene solution of coumarin 519 dispersed in water) while laser-trapped. The excitation wavelength was 400 nm and the wavelength of fluorescence measured was 520 nm. FIG. 12(a) shows signals obtained when the excitation light was parallel with the gate light and when it was perpendicular to the gate light. By using the above-described technique, the difference in fluorescence intensity between the individual delay times due to polarization can be accurately determined. By calculating the anisotropy $(I_{\|}-I_{\perp})/(I_{\|}+2I_{\perp})$ based on FIG. 12(a), the rotation constant of coumarin in the drop can be determined, as shown in FIG. 12(b). The time constant of rotation relaxation was determined to be 25.2 ps by fitting the value of polarization anisotropy with an exponential function.

MEASUREMENT EXAMPLE 5

By utilizing the high time resolution of the femtosecond time-resolved microscope according to the invention, the transfer of excitation energy that occurs in a microregion can be investigated.

Figure 13:
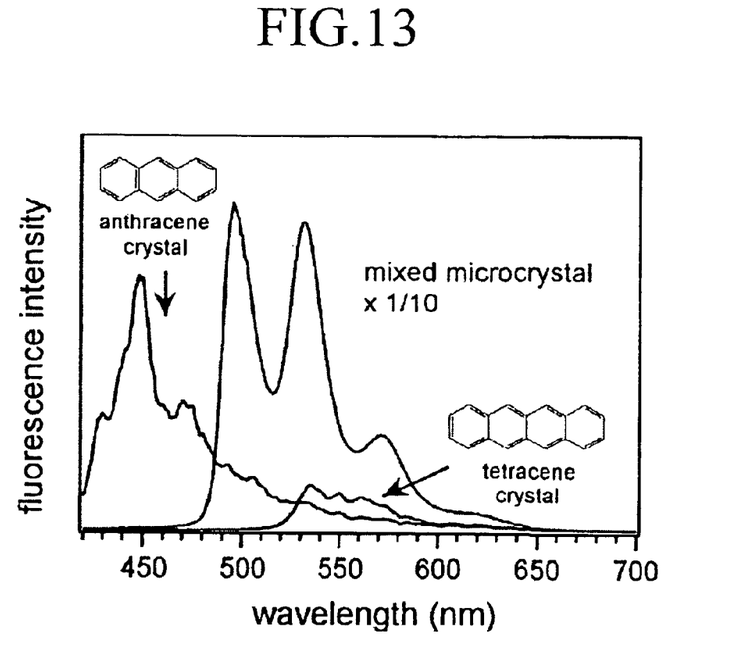
FIG. 13 shows a steady-state fluorescence spectrum of an anthracene-tetracene mixed crystal.
Figure 14:
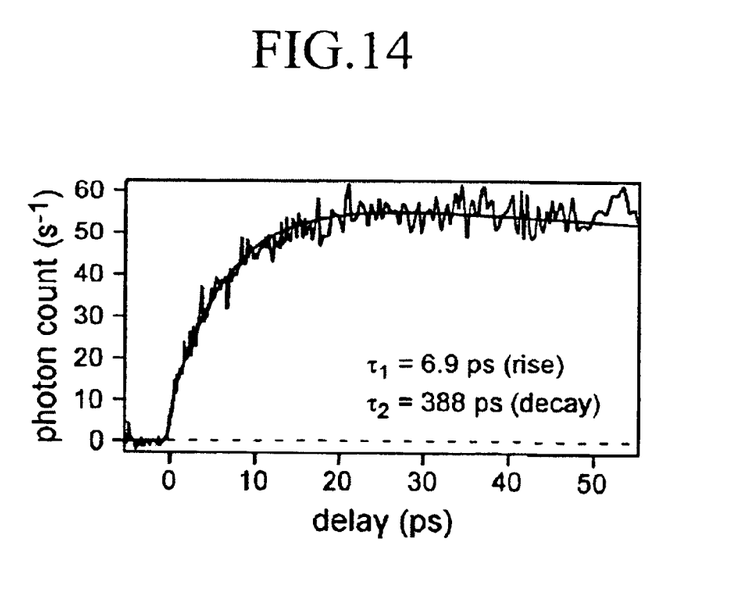
FIG. 14 shows a time-resolved fluorescence (500 nm) obtained from anthracene-tetracene mixed crystal.

FIG. 13 shows the steady-state fluorescence spectrum obtained upon excitation of a mixed microcrystal of anthracene and tetracene (mixture molar ratio 1:0.01). The resultant spectrum had maxima at $\leq 500$, 530, 570, and 620 nm, which can be attributed to the emission from monomer tetracene existing in the anthracene crystal, based on a comparison with the fluorescence spectrum of tetracene in a solution. Upon excitation of a single crystal of tetracene, only weak fluorescence was observed as shown in FIG. 13, whereas in the mixed crystal a very strong fluorescence was observed from tetracene. This indicates that in the mixed crystal an efficient transfer of excitation energy occurred from anthracene to tetracene. FIG. 14 shows a time dependence of fluorescence observed at 500 nm. The resultant time dependence exhibits an exponential rise with a time constant of 6.9 ps and decays with a time constant of approximately 400 ps. When the time-resolved fluorescence was observed at wavelength 470 nm at which emission from the anthracene crystal was observed, very weak fluorescence decay with the same time constant as $\tau_1$ was observed. Thus, it can be concluded that $\tau_1$ indicates the time of excitation energy transfer (exciton diffusion) from anthracene to tetracene.

Thus, in accordance with the present invention, time-resolved measurement can be conducted of fluorescence from a submicron-order microregion of a sample with a time resolution of the order of femtosecond.

What is claimed is:

1. A time-resolved fluorescence microscope comprising:

a pin hole;

a sample stage on which a sample is mounted;

an objective lens system for projecting a reduced-size image of the pin hole on the sample on the sample stage while focusing fluorescence emitted by the sample at the pin hole;

pulsed-laser emitting means;

light-dividing means for dividing laser light emitted by the pulsed-laser emitting means into two portions;

means for causing one portion of the laser light divided by the light-dividing means to enter the pin hole as a sample excitation light;

optical-path length varying means for varying the optical path of the other portion of the laser light divided by the light-dividing means;

a non-linear optical element for mixing the fluorescence from the sample exiting from the pin hole and the laser light that has passed through the optical-path length varying means to produce a sum frequency light;

spectroscope means for analyzing the sum frequency light produced by the non-linear optical element to spectroscopy;

a detector for detecting light emerging from the spectroscope means; and recording means for recording an output obtained from the detector as the optical path length of the other portion of the laser light is varied by the optical-path length varying means.

2. The time-resolved fluorescence microscope according to claim 1, wherein a prism pair is disposed in the optical path of the sample excitation light between the light-dividing means and the pin hole, wherein a negative dispersion is given to the excitation light in advance.

3. The time-resolved fluorescence microscope according to claim 2, further comprising:

a ½ wavelength plate disposed in the optical path of the sample excitation light; and a control unit for controlling the angle of the ½ wavelength plate and the optical-path length varying means in an interlocked manner.

4. The time-resolved fluorescence microscope according to claim 2, wherein a collimator lens, an iris and a condenser lens are disposed between the non-linear optical element and the spectroscope means, the collimator lens rendering the light that has passed through the non-linear optical element into parallel light, wherein the sum-frequency light produced by the non-linear optical element is separated before being incident on the spectroscope means, the sum-frequency light also passing through an optical band-pass filter which is located at the entrance of the spectroscope so that only the sum-frequency light enters the spectroscope.

5. The time-resolved fluorescence microscope according to claim 4, wherein a total reflection mirror is disposed between the pin hole and the objective lens system as an optical element for bending optical path.

* * * * *